F. C. DABNEY.
TABLE SLIDE.
APPLICATION FILED MAY 7, 1917.

1,299,687.

Patented Apr. 8, 1919.

Witness
J. R. Fowler
H. A. Mitchell

F. C. Dabney
Inventor

By C. A. Snow & Co.
Attorneys

UNITED STATES PATENT OFFICE.

FRANK C. DABNEY, OF WICHITA, KANSAS.

TABLE-SLIDE.

1,299,687.     Specification of Letters Patent.     Patented Apr. 8, 1919.

Application filed May 7, 1917. Serial No. 166,942.

*To all whom it may concern:*

Be it known that I, FRANK C. DABNEY, a citizen of the United States, residing at Wichita, in the county of Sedgwick and State of Kansas, have invented a new and useful Table-Slide, of which the following is a specification.

The subject of this invention is an equalizing table slide wherein a bridge bar and sliding bars are coöperatively associated, and the objects of the invention are, first, to provide a slide that will always extend equal distances on each side of a common center; second, to provide a slide with means for imparting motion from one slide bar to another and in the opposite direction, third, to provide a simple and efficient slide.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

A practical embodiment of the invention is shown in the accompanying drawings, wherein.

Figure 1:
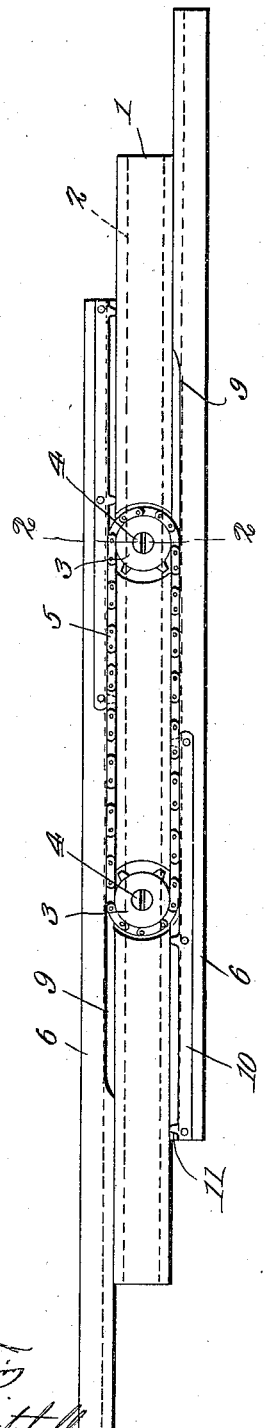
Figure 1 is a plan view of a slide constructed in accordance with my invention.
Figure 2:
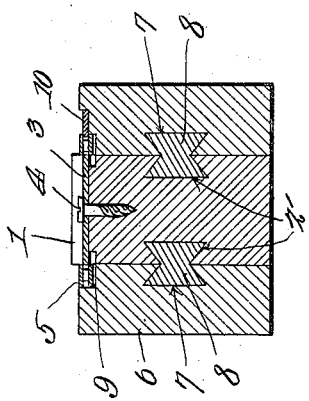
Fig. 2 is a cross section on the line 2—2 of Fig. 1.

Referring to the drawing by numerals:

The slide consists of a bridge piece 1 formed with a longitudinal dovetail groove 2—2 in each side thereof. Sprocket wheels 3 are mounted on one edge of the bridge piece 1 and turn on suitable journals such as the screws 4. A sprocket chain 5 passes over the two wheels 3. These wheels and their chains are preferably placed in a depression formed in the edge of the bridging bar 1.

Similar slide bars 6—6 each provided with a longitudinal dovetail groove 7 are positioned one on each side of the bridge bar 1 to which they are slidably held by grooved blocks 8 which are adapted to the grooves 2 and 7 in the usual manner. Each slide bar 6 is formed with a cut out portion 9 which extends longitudinally of the bar for a portion of its distance. Secured to each bar 6 at one end thereof, is a longitudinally extending rack 10 formed with spaced teeth 11 which overlie the cut out portion 9 for a portion of its length and are adapted to enter the open links of the chain 5.

The slide is secured to a table in the usual manner. When the sections of the table are drawn apart or forced together each half will travel equally because a tooth of each rack is always in engagement with the chain 5 and any motion of one slide bar 6 will move the chain and carry the other slide bar with it in the opposite direction to that in which the fast slide bar is moving.

Having described my invention, what I claim as new and desire to secure by Letters Patent, is:

A table slide, including a bridging bar, slide bars mounted on each side of the bridging bar for rectilinear movement longitudinally thereof, the slide bars having cut out portions extending longitudinally thereof, spaced sprocket wheels journaled on a horizontal face of the bridging bar, a chain passing about the sprocket wheels, and racks secured to the slide bars and overlying the cut out portions, there being spaced teeth on the racks adapted to enter the links of the chain.

In testimony that I claim the foregoing as my own I have hereto affixed my signature in the presence of two witnesses.

FRANK C. DABNEY.

Witnesses:
   WILLIAM KEITH,
   EDNA CARSON.

Copies of this patent may be obtained for five cents each, by addressing the "Commissioner of Patents, Washington, D. C."